April 17, 1945.  L. E. JONES  2,373,897
UNIVERSAL JOINT
Filed April 1, 1943  2 Sheets-Sheet 1

INVENTOR.
LLOYD E. JONES.
BY John W. Michael
ATTORNEY.

April 17, 1945.  L. E. JONES  2,373,897
UNIVERSAL JOINT
Filed April 1, 1943   2 Sheets-Sheet 2

INVENTOR.
LLOYD E. JONES.
BY John W. Michael
ATTORNEY.

Patented Apr. 17, 1945

2,373,897

UNITED STATES PATENT OFFICE 2,373,897

UNIVERSAL JOINT

Lloyd E. Jones, Milwaukee, Wis., assignor to Graham Transmissions, Inc., Milwaukee, Wis., a corporation of Delaware Application April 1, 1943, Serial No. 481,418

6 Claims. (Cl. 64—7)

This invention relates to universal joints and is in the nature of an improvement in the type of joint described and claimed in U. S. Patent 2,319,319, issued to Louis A. Graham, for "Torque transmitting device," on May 18, 1943, and assigned to the assignee of the present application.

An object of the invention is to simplify and compact the construction of a universal joint of this character and to reduce to a minimum the number of parts that compose it.

Another object of the invention is to so constitute and combine the parts that make up the joint that the maximum available supporting area is had between the surfaces in universal bearing engagement with each other, and that the thrusts set up in the joint are imposed upon the elements thereof best adapted to withstand the same.

A further object of the invention is to provide a universal joint of this character and having these advantages, and which is strong and rugged in construction, highly effective and advantageous in operation, readily and easily assembled and disassembled, and easy and comparatively inexpensive to manufacture.

To realize these advantages, the socket of the joint, which is fixed to one shaft section, or one of the torque-transmitting members, is constructed with a cavity of spherical formation, and is also provided with a slot which intersects the cavity and extends out through the entrance end of the socket. The ball or head member of the joint, which is integral with the other shaft section, or torque-transmitting member, is flattened transversely so as to present flat side faces disposed lengthwise of or in longitudinal relation to the shaft, and, of course, positioned beyond one end of the shaft. The outer edges of the flat side faces of the ball or head member are connected by outer peripheral surfaces of spherical form which have a substantial extent in a direction lengthwise or longitudinally with respect to the shaft. The flattened ball or head member is of a thickness corresponding to the width of the slot in the socket and the spherical outer peripheral surfaces thereof have a diameter corresponding to that of the spherical formation of the cavity of the socket. With such a construction, when the flat side faces of the head or ball member are presented to the walls of the slot of the socket, the ball may be inserted into the cavity thereof until it is in concentric relationship therewith, and then the ball or head member and its shaft may be rotated about their common longitudinal axis to bring the spherical outer peripheral surfaces of the ball or head member into universal bearing engagement with the spherical formation of the socket.

A structure of this character may be used to best advantage where it is permissible to construct the socket of an appropriate length as this makes it feasible to so dimension the head or ball member that the outer spherical peripheral surfaces thereof will have a substantial extent longitudinally or lengthwise, and in this way provide supporting areas of effective dimensions.

The structure is completed by combining with the head or ball member and the socket a suitable coupling or driving pin, the shank of which is fitted in an opening extending transversely through the head or ball member from one flat face thereof to the other, the head of the pin having driving engagement with the walls of the slot. The coupling or driving pin, in the joint embodying the present invention, serves merely to transmit the torque and is not subjected to any thrusts set up in the joint since these are taken by the interengaging surfaces of the ball and socket due to the integral formation of the head or ball member with its shaft section.

Universal joints embodying the invention are capable of advantageous use wherever it is desirable to flexibly couple two shaft sections or two torque-transmitting members to each other. When, however, it is embodied in a variable speed planetary transmission, and is utilized to transmit the torque developed by the planet rollers to the ring or orbit gear fixed to the output shaft of the transmission, additional advantages are realized in that it then becomes feasible to constitute each planet roller, its bearing trunnions, and the ball or head member, as an integral unitary structure, and to produce the same in such form as an article of manufacture.

Other objects and advantages reside in certain novel features of the construction, arrangement, and combination of parts, which will be hereinafter more fully described and particularly pointed out in the appended claims, reference being had to the accompanying drawings forming a part of this specification, and in which:

Figure 8:
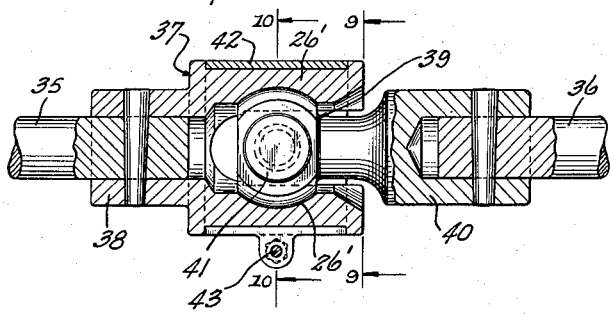
Figure 8 is a fragmentary view partly in central, vertical, longitudinal cross section, partly in side elevation, showing a universal joint embodying the present invention and designed for general use or application.
Figure 9:
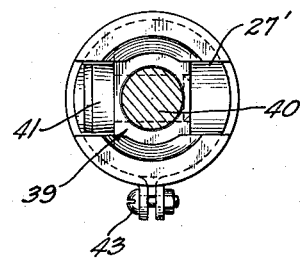
Figure 11:
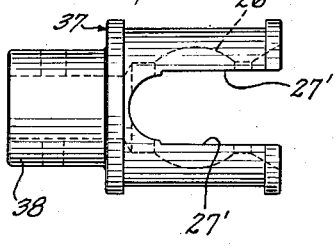
Figure 12:
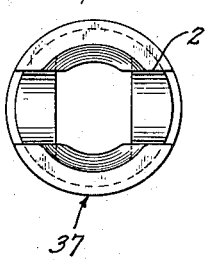
Figure 10:
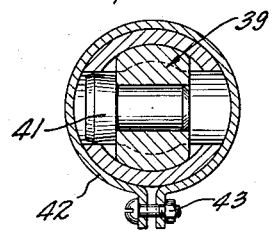
Figure 13:
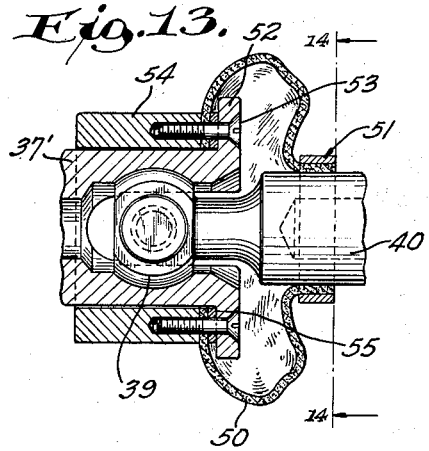
Figure 14:
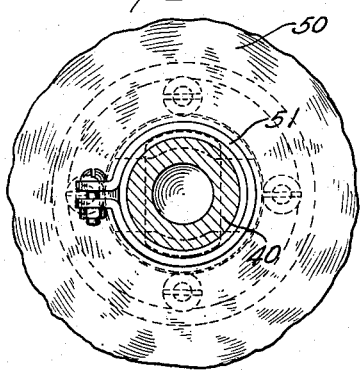

Figures 9 and 10 are views in transverse, vertical cross section, taken on lines 9—9 and 10—10, respectively, of Figure 8;

Figure 11 is a detail view in side elevation of the socket structure;

Figure 12 is a view of the socket in end elevation looking toward the right-hand end of Figure 11;

Figure 13 is a view partly in side elevation and partly in longitudinal, vertical cross section, illustrating a universal joint of the general type shown in Figure 8 but equipped with a grease retainer; and Figure 14 is a view in transverse, vertical cross section taken on line 14—14 of Figure 13.

In the drawings, the invention is shown in Figures 1 to 7 as embodied in a variable speed planetary transmission, whereas in Figures 8 to 14 it is shown as embodied in a structural type adapted for general application.

Figure 1:
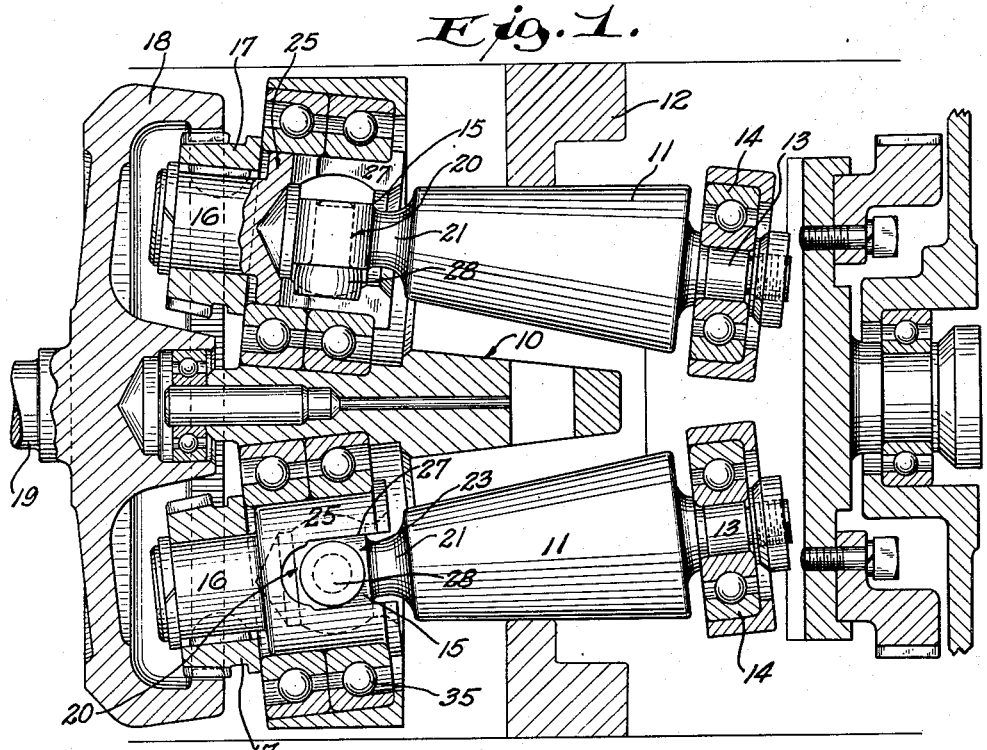
Figure 1 is a fragmentary view partly in longitudinal vertical cross section and partly in side elevation showing the universal joint embodying the present invention and also illustrating fragments of variable speed planetary gear transmission with which the joint may be combined.
Figures 2, 3:
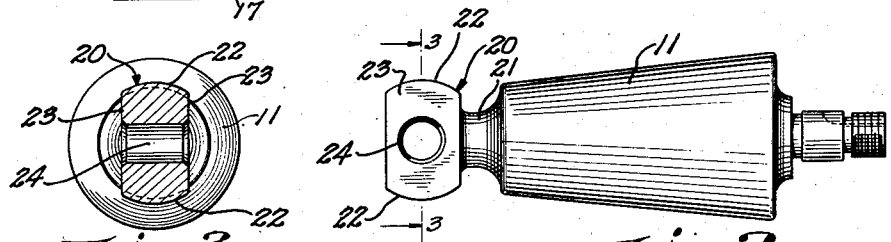
Figure 2 is a detail view in elevation of the roller with its integral ball.
Figure 3 is a view in vertical cross section, taken on line 3—3 of Figure 2.
Figure 4:
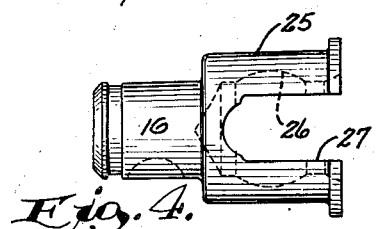
Figure 4 is a detail view in elevation illustrating the socket and shaft structure.

Referring first to Figures 1 to 7, and more particularly to Figure 1, there is illustrated a variable speed planetary transmission of the type disclosed in U. S. Letters Patent No. 1,887,505, granted on November 15, 1932, to George H. Gibson, for "Variable speed transmission."

Such a transmission includes a rotary carrier, a portion of which is designated at 10, and a suitable number of tapered planet rollers 11 encircled and controlled by the longitudinally adjustable control or traction ring 12. At their large ends the rollers 11 have integral trunnions 13 rotatably supported in bearings 14 mounted on the carrier 10.

Each universal joint embodying the present invention is designated as a whole at 15 and serves to interconnect the small ends of the planet rollers 11 with short or stub shafts 16 to which planet pinions 17 are keyed, the planet pinions 17 meshing with the ring or orbit gear 18 fixed to the output shaft 19 of the transmission.

The present invention proposes to constitute the universal joint 15 by forming a head or ball member 20 thereon integral with each roller 11, or rather integral with the trunnion 21 at the small end of each roller 11. The roller 11, trunnion 21, and head or ball member 20, are all one piece of metal. The head or ball member 20 has its periphery formed with spherical formations or surfaces 22, and is flattened—that is, has flat side faces or walls 23. An opening 24 extends transversely through the ball member from one flat face 23 to the other.

It will be seen from the drawings that the head or ball member 20 is slab-like in construction, in that it is generally in the form of a rectangular block or slab with outer peripheral surfaces of spherical formation. Moreover, the flat side faces of the head or ball member are disposed crosswise of and parallel with respect to the axis of the planet roller, and the head or ball member is so dimensioned or proportioned that its spherical surfaces are substantial in extent in a direction lengthwise and longitudinally in respect to the axis of the planet roller. This construction is practical where the socket with which it cooperates, and which will be hereinafter described, may be made of appropriate length, and it is advantageous in that it renders available the maximum engaging or supporting surfaces between the ball or head member and its cooperable socket.

The socket of the universal joint, designated at 25, is integral with the pinion shaft 16. The cavity of this socket is internally machined to provide spherical surfaces or formations 26, and is also provided with diametrically opposite slots 27 which intersect the spherical formations 26 and extend out through the entrance end of the socket.

The parts are so dimensioned and proportioned that the flattened ball member has a thickness corresponding to the width of the slots 27 of the socket 25. Moreover, the sperical formations or surfaces 22 on the periphery of the ball member 20 are of substantially the same diameter as the sperical formations or surfaces 26 of the socket, such clearance being provided as is practical for the assembly of these parts and for a universal bearing engagement between them.

In assembling the parts, the flattened ball member 20 is inserted through the slots 27 and then rotated about its own axis until the spherical formations 22 of the ball member come into engagement with the spherical formations 26 of the socket 25. In this adjustment, the opening 24 is alined with the slots 27 of the socket 25.

A headed coupling or driving pin 28 is then assembled with the ball and socket, the shank 29 of the pin being a press or driven fit in the opening 24, and the head 30 thereof being disposed in one of the slots 27 and in driving engagement with the side walls thereof.

When the universal joint is utilized in a variable speed planetary transmission, the outer periphery of the socket 25 is flanged and adapted to be mounted in suitable bearings 35 supported on the rotary carrier.

Figures 6, 7:
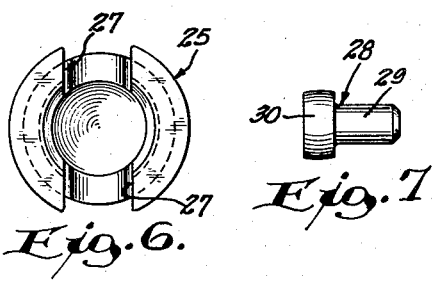
Figure 6 is a view in end elevation looking towards the socket from line 6—6 of Figure 5.
Figure 7 is a view in side elevation of the coupling or driving pin.
Figure 5:
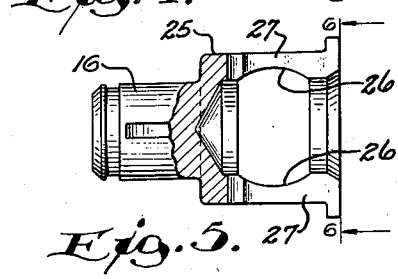
Figure 5 is a view similar to Figure 4 with the socket rotated 90° and parts broken away for the sake of illustration.

Referring now to Figures 8 to 10, the shaft sections to be flexibly coupled are designated at 35 and 36. A socket 37 is pinned or otherwise suitably secured to the shaft section 35. This socket 37 is the same in construction as the socket 25 except that its outer periphery is double-flanged, instead of single-flanged, and that it has a tubular formation 38 at one end to adapt it to be connected up to its shaft 35. Like the socket 25 it has a cavity which is internally fashioned to provide spherical surfaces or formations designated at 26' and corresponding to the formations 26 of the socket 25. The socket 37 also has diametrically opposite slots designated at 27', the slots 27' corresponding to the slots 27 of the socket 25 and, like the slots 27, intersect the spherical formations of the cavity of the socket and extend out through the entrance end of the socket. A head or ball member, designated generally at 39, is provided, and is identical with the head or ball member 20 save that instead of being integrally formed with the planet roller, it is provided integrally with a shaft section 40 which in turn receives and is rigidly connected to a shaft 36. The dimensions and proportions and the manner of assemblying the head or ball member in the socket are all the same. In the construction of the character shown in Figures 8 to 10, it is not essential that the coupling pin, there designated at 41, and similar to the coupling pin 28, have its shank press-fitted in the transverse opening which is provided in the head or ball member, but where a press-fit is not resorted to to retain the pin in place, a retaining band 42 is provided, the band being split and encircling the socket and having apertured ears which confront each other and which coact with a bolt and nut 43 to fasten the band in place. As shown in the drawings, the form of the head of the coupling pin may be varied. For example, it may be rounded, as shown in Figures 1 and 7, or it may be of the doubled, tapered formation shown in Figures 8, 9, and 10. In either event, it will effectively transmit torque and yet is free to partake of its necessary relative movements with respect to the walls of the slot.

In Figures 13 and 14, a construction very similar to that shown in Figures 8 and 10 is illustrated. The joint shown in Figures 13 and 14 comprises a socket 37' similar to the socket 37, and coacting with the ball member 39 which is identical, of course, with the ball member shown in Figures 8, 9, and 10. The only difference between the construction shown in Figures 13 and 14 and that shown in Figures 8 to 10 resides in the provision of a grease retainer 50, which may be constructed of any suitable flexible material. The grease retainer is in the form of an open-ended bag-like structure, and has one end embracing and clamped, as at 51, to the shaft section 40. The other end of the grease retainer extends over a flange 52 integrally with the socket 37', and is clamped to this flange and hermetically sealed thereto. Such clamping and sealing may be accomplished in any suitable way, as for example by screws 53 extending through openings in the flange 52 and in the adjacent end of the retainer 50 and threading into openings provided therefor in a clamping ring 54 which is slidable on the socket 37'. When the screws 53 are tightened up, the clamping ring 54 presses the end of the grease retainer 50 associated with it firmly up against a washer 55 placed between the flange 52 and the adjacent portion of the grease retainer.

In the various embodiments of the invention, the socket is shown and described as having diametrically opposite slots. This is practically advantageous as it is easy to manufacture and yields a well-balanced structure. However, two slots are not essential. Obviously, one such slot will serve, as one slot will permit of the assembly and organization of the parts in the manner contemplated and described.

It has been pointed out that with a construction of this kind, the socket must be of such length as to make it feasible to so dimension the head or ball member that the outer spherical peripheral surfaces thereof will have a substantial extent longitudinally or lengthwise. Usually, in practice, it is desirable that the spherical peripheral surfaces of the lower member have an extent lengthwise with respect to the shaft approximately equal to or greater than one-quarter the circumference of a great circle of spherical surfaces.

While I have shown and described several constructions in which the invention may be advantageously embodied, it is to be understood that the constructions shown have been selected merely for the purpose of illustration or example, and that various changes in the size, shape, and arrangement of the parts may be made without departing from the spirit of the invention or the scope of the subjoined claims.

I claim:

1. A universal joint comprising a socket having a cavity of spherical formation and also having a slot intersecting the cavity and extending out through the entrance end of the socket, a shaft, a head integral with the shaft and having flat side faces lying in planes disposed longitudinally with respect to said shaft and also having outer peripheral surfaces of spherical form connecting said flat side faces, said head being insertable into said cavity when the flat side faces thereof are presented to the walls of the slot, said head and shaft being rotatable about their common, longitudinal axis to bring said spherical surfaces into universal bearing engagement with the spherical formation of said cavity when said head is concentrically disposed in said cavity, and a driving pin interengaged with the head and with the socket for transmitting torque therebetween.

2. A universal joint comprising a socket having a cavity of spherical formation and also having a slot intersecting the cavity and extending out through the entrance end of the socket, a shaft, a head integral with the shaft and having flat side faces lying in planes disposed longitudinally with respect to said shaft and also having outer peripheral surfaces of spherical form connecting said flat side faces, said head being insertable into said cavity when the flat side faces thereof are presented to the walls of the slot, said head and shaft being rotatable about their common, longitudinal axis to bring said spherical surfaces into universal bearing engagement with the spherical formation of said cavity when said head is concentrically disposed in said cavity, said head having an opening extending transversely thereof and out through its side faces, and a headed driving pin having its shank engaged in said opening and having its head fitted in and in driving engagement with the walls of said slot.

3. A shaft coupling comprising a socket having a cavity of spherical formation intersected by a slot extending longitudinally out through the entrance end of the socket, a shaft, a ball member integral with the shaft and having parallel sides flattened parallel to the shaft axis and spherical peripheral surfaces, the ball member being insertable through the slot when the spherical surfaces are presented thereto and being rotatable about the longitudinal axis common to it and the shaft after the ball member is inserted in the cavity thereby bringing the spherical surfaces thereof into bearing engagement with the spherical formation of the cavity, and a driving pin interengaged with the ball member and the socket for transmitting torque therebetween.

4. A shaft coupling comprising a socket having a cavity of spherical formation intersected by a slot extending longitudinally out through the open end of the socket, a shaft, a ball member integral with the shaft, the ball member having parallel sides flattened parallel to the shaft axis and having spherical peripheral surfaces, the ball member being insertable through the slot when the spherical surfaces are presented thereto and being rotatable about the longitudinal axis common to the shaft and the ball member after the ball member is inserted in the cavity whereby the spherical surfaces of the ball member are brought into bearing engagement with the spherical formation of the cavity, the spherical peripheral ball surfaces having an extent lengthwise with respect to the shaft of approximately one-fourth the circumference of a great circle of said spherical surfaces, and a driving pin interengaged with the ball member and the socket for transmitting torque therebetween.

5. A universal joint comprising a socket having a cavity of spherical formation and also having a slot intersecting the cavity and extending out through the entrance end of the socket, a shaft, a slab-like head integral with and projecting beyond one end of the shaft and having flat side faces lying in planes disposed longitudinally with respect to the shaft, and also having outer peripheral surfaces of spherical form extending lengthwise with respect to the shaft and also connecting the outer edges of the side faces of the head, said head being insertable in said slot when the flat side faces thereof are presented to the walls thereof, said head and said shaft being rotatable about their common longitudinal axis to bring said spherical surfaces into universal bearing engagement with the spherical formation of said cavity when said head is concentrically disposed in said cavity, said head having an opening extending transversely thereof and out through its flat side faces, and a headed driving pin having its shank engaged in said opening and having its head fitted in and in driving engagement with the walls of said slot.

6. A flexible shaft coupling of the head and socket type comprising a socket having a cavity of spherical formation and also having a slot radially intersecting the cavity and extending longitudinally out through the entrance end of the socket, a shaft, a head integral with the shaft and comprising a generally rectangular block having flat side faces and outer surfaces of spherical form connecting said flat side faces, said block being of a thickness corresponding to the width of the slot so that the head may be inserted into the cavity when the flat side faces are presented to the walls of the slot, said spherical surfaces being of substantially the same diameter as the spherical formations of the cavity so that when the head is concentrically disposed in the cavity the head and shaft may be rotated about their common longitudinal axis to bring said spherical surfaces into universal bearing engagement with the spherical formations of said cavity, and a coupling pin interengaged with said head and socket for transmitting torque therebetween.

LLOYD E. JONES.